Nov. 8, 1932.　　　　P. DADDIO　　　　1,886,470
PNEUMATIC TIRE
Filed July 16, 1930
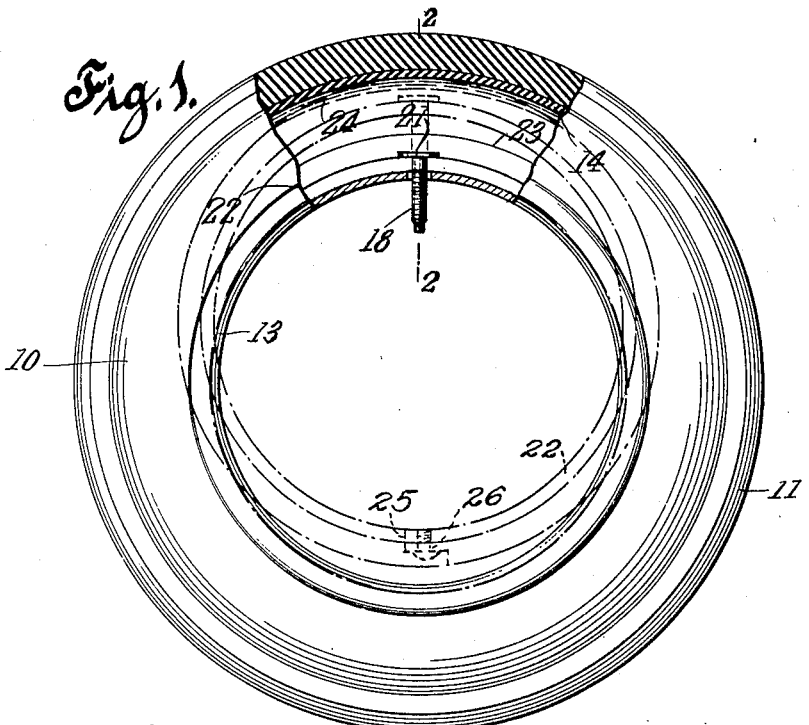

Patented Nov. 8, 1932

1,886,470

UNITED STATES PATENT OFFICE

PASQUALE DADDIO, OF NEW YORK, N. Y.

PNEUMATIC TIRE

Application filed July 16, 1930. Serial No. 468,311.

This invention relates to improvements in pneumatic tire construction of types used in connection with wheeled vehicles of the better class, and has as one of its objects the provision of means whereby punctures may be automatically healed, should such occur.

A further feature is in the provision of an inner tube and co-operative member, arranged in a novel manner to prevent the leakage of air from the tire.

Another aim is to provide a tire carcass with an inner tube united thereto and provided with air retaining means adjacent the tire rim. Still another purpose is to produce a tire carrying a supply of self-mending matter in its interior.

These several advantageous objects are obtained by the novel construction, combination and arrangement of parts hereinafter described and shown in the accompanying drawing, forming a material part of this disclosure, and in which:

Fig. 1 is a side elevational view of a conventional type of pneumatic tire, partially broken away in order to show the construction.

Fig. 2 is a transverse sectional view of the tire, taken on line 2—2 of Fig. 1, and showing the preferred form of construction.

Fig. 3 is a similar transverse sectional view of a modified form of construction, taken at a point remote from the air valve.

Fig. 4 is a detail of a modified form of filler strip.

In these several views the numeral 10 designates in general a conventional pneumatic tire of the type having a thickened tread 11, the tire walls being gradually reduced in thickness from the tread to its anchor bead elements 12, which are normally seated in a rim 13.

The inner tube 14, in the present disclosure, is open throughout its length at its inner circumference, as at 15, its edges resting upon a filler 16 which, like the tube, is highly elastic and pliable, this filler member being interposed in the manner of a cushion between the rim and tire beadings, as best seen in Fig. 3.

Furthermore, the entire exterior of the inner tube 14 is cemented as at 17, to the inner peripheral walls of the tire carcass, rather than free as is common.

A single air valve 18 is employed containing an air passage 19, the valve preferably being in two sections, the inner section 20 of which is provided with the usual enlarged head 21.

As shown in Fig. 2, the head 21 is drawn to abut a pliable filler strip 22 of rubber or equivalent material, this strip presenting opposed triangular portions at its sides which terminate in thin edges 23, adapted to lie tightly against the inner walls of the inner tube presenting an air and moisture proof joint.

This filler strip or ring may likewise be made of metal as shown in Fig. 4, in which case, in order to facilitate the entrance of the metal filler strip or ring into the interior of the tire, the ring is provided with a half-lap or other joint 25 which, after the ring is inserted, may be locked by any suitable fastening means as the screw 26. When the screw 26 is removed one end of the ring 22' may be drawn over the other thus shortening the diameter of the ring to allow it to enter the tire.

A suitable sticky sealing compound 24 may be readily entered into the interior of the inner tube by removing the outer element 18 of the air valve, and may be used in any suitable quantity, this compound remaining entirely free within the inner tube, floating from place to place, and, when the tire is rapidly revolved as upon the periphery of the vehicle wheel, the liquid is thrown outwardly by centrifugal force as seen in Fig. 1, so that should puncture occur, the liquid will immediately find and fill the opening, sealing and curing the opening, thus occurring, so as to prevent the escape of air.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described the invention, what is claimed as new and desired to secure by Letters Patent, is:—

1. The combination with a self-healing vehicle tire having a rim, a tire carcass and an inner tube open throughout its length at its inner circumference and cemented or otherwise attached to the interior of the carcass throughout its entire area, of a transversely split filler ring having opposed angled edges and adapted to be disposed in said inner tube and to engage the walls thereof to cover the opening therein to produce an air seal therewith and detachable securing means for the ends of the split ring.

2. The combination with a self-healing vehicle tire having a rim, a tire carcass and an inner tube open throughout its length at its inner circumference and cemented or otherwise attached to the interior of the carcass throughout its entire area, of a metallic transversely split filler ring adapted to be disposed in said inner tube and to engage the walls thereof to cover the opening therein to produce an air seal therewith, and detachable securing means for the ends of the split ring.

Signed at New York, in the county and State of New York, this 2nd day of July, 1930.

PASQUALE DADDIO.